United States Patent
Gaborski

Patent Number: 6,018,590
Date of Patent: Jan. 25, 2000

[54] TECHNIQUE FOR FINDING THE HISTOGRAM REGION OF INTEREST BASED ON LANDMARK DETECTION FOR IMPROVED TONESCALE REPRODUCTION OF DIGITAL RADIOGRAPHIC IMAGES

[75] Inventor: Roger S. Gaborski, Pittsford, N.Y.

[73] Assignee: Eastman Kodak Company, Rochester, N.Y.

[21] Appl. No.: 08/946,557

[22] Filed: Oct. 7, 1997

[51] Int. Cl.$^7$ .................................................. G06K 9/00
[52] U.S. Cl. .................... 382/168; 382/132; 382/197; 382/199; 382/209
[58] Field of Search ................................. 382/132, 168, 382/173, 190, 192, 197, 199, 203, 209, 242, 128, 133, 134, 171, 172, 224; 378/62

[56] References Cited

U.S. PATENT DOCUMENTS

| | | | |
|---|---|---|---|
| 4,839,807 | 6/1989 | Doi et al. | 364/413.13 |
| 4,914,295 | 4/1990 | Shimura et al. | 250/327.2 |
| 4,952,805 | 8/1990 | Tanaka | 250/327.2 |
| 5,040,225 | 8/1991 | Gouge | 382/128 |
| 5,068,788 | 11/1991 | Goodenough et al. | 364/413.14 |
| 5,164,993 | 11/1992 | Capozzi et al. | 382/132 |
| 5,198,669 | 3/1993 | Namiki et al. | 290/327.2 |
| 5,268,967 | 12/1993 | Jang et al. | 382/132 |
| 5,426,684 | 6/1995 | Gaborski et al. | 378/62 |

Primary Examiner—Phuoc Tran
Attorney, Agent, or Firm—William F. Noval

[57] ABSTRACT

Locating the region of interest (ROI) in the histogram of a digital radiographic image is a key component for the optimized presentation of the image, either in hardcopy or softcopy display. A method for locating the ROI first locates key candidate landmarks present in a particular body part radiographic image (i.e., chest pelvis, hand, etc.). Next, a library of spatially located landmarks are matched to the candidate landmarks and used to locate the region of interest in the radiograph using geometric techniques. The histogram of the selected region of interest is used to develop the final tonescale curve used to process the image.

8 Claims, 6 Drawing Sheets

| INDEX | | | | | | |
|---|---|---|---|---|---|---|
| Body Part #1 | Feature #1 | Feature #2 | ... | Feature #m | | ROI |
| Body Part #2 | Feature #1 | Feature #2 | ... | Feature #m | | ROI |
| Body Part #3 | Feature #1 | Feature #2 | ... | Feature #m | | ROI |
| Body Part #4 | Feature #1 | Feature #2 | ... | Feature #m | | ROI |
| ″ ″ ″ | ″ ″ ″ | ″ ″ ″ | ″ ″ ″ | ″ ″ ″ | | ″ ″ ″ |
| Body Part #n | Feature #1 | Feature #2 | ... | Feature #m | | ROI |

FIG. 8

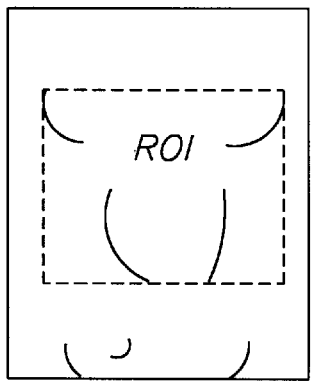
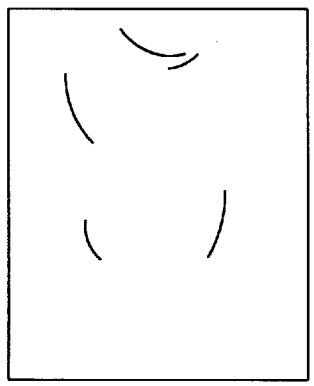
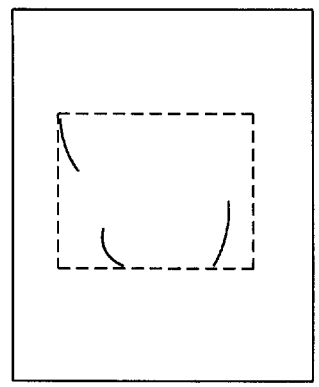
FIG. 9a     FIG. 9b     FIG. 9c
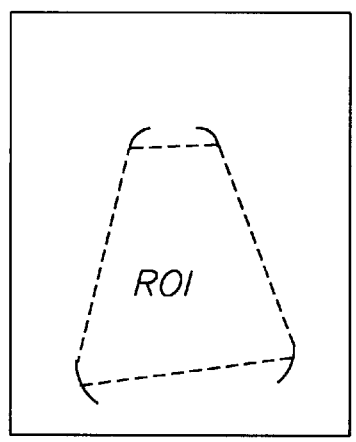
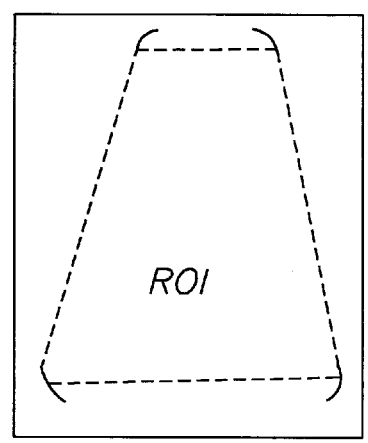
FIG. 10a     FIG. 10b

TECHNIQUE FOR FINDING THE HISTOGRAM REGION OF INTEREST BASED ON LANDMARK DETECTION FOR IMPROVED TONESCALE REPRODUCTION OF DIGITAL RADIOGRAPHIC IMAGES

FIELD OF THE INVENTION

This invention relates in general to digital image processing, and more specifically relates to a method for finding the region of interest that is used to develop the final tonescale curve for processing an image.

BACKGROUND OF THE INVENTION

In medical imaging, accurate diagnosis depends on the optimal presentation of the image, either on hardcopy or softcopy display. The optimal presentation will allow the radiologist to observe and detect small abnormalities that may not be visible in a presentation that is less than optimal.

In conventional screen/film radiography, the tonescale curve is built into the film as a function of the emulsion developed by the film manufacturer. The chemical development of the film also affects the final image visible on the film. Different films are available from manufactures to obtain "different looks" on the film.

The process of digitizing a film or obtaining the image by digital means, either storage phosphor or direct digital techniques, separates the acquisition step from the imaging processing steps used to obtain the final image. This separation allows an arbitrary tonescale curve to be used to obtain the final look of the image.

The purpose of the tonescale curve is to map the relevant code values obtained from either the digitization process or the direct digital acquisition to the final range of code values that will result in an optimal image presentation in some sense. Typically, this would not be a one to one mapping, and certain ranges of code values would be allocated more dynamic range than other code values in the final rendered image.

A common approach to find the region of interest is to analyze the code value histogram. This method works best when the peaks in the histogram corresponding to the region of interest are separated from the undesired regions. If the regions overlap, it becomes more difficult to find the region based on the analysis of the histogram only. Goodenough et al., U.S. Pat. No. 5,068,788, issued Nov. 26, 1991; Namiki et al., U.S. Pat. No. 5,198,669, issued Mar. 3, 1993; Doi et al., U.S. Pat. No. 4,839,807, issued 4,839,807, issued Jun. 13, 1989; Gouge, U.S. Pat. No. 5,040,225, issued Aug. 13, 1991; Shimura, U.S. Pat. No. 4,914,295, issued Apr. 3, 1990; Tanaka, U.S. Pat. No. 4,952,805, issued Aug. 28, 1990, are all histogram based techniques that do not solve this problem.

A method has been proposed by several researchers to obtain an optimal image by first segmenting the body part from foreground and background regions and then performing a histogram analysis on the remaining segmented image (Capozzi and Schaetzing, issued Nov. 17, 1992, U.S. Pat. No. 5,164,993; Jang and Schaetzing, issued Dec. 7, 1993, U.S. Pat. No. 5,268,967). These techniques require successful separation of the body part from the foreground and background.

A method based on the texture analysis of the image is described by Gaborsid, et al., U.S. Pat. No. 5,426,684, issued Jun. 20, 1995. Although this method overcomes some of the short comings of analyzing the code value histogram itself, the method requires substantial computer time to calculate the texture features.

All of these techniques find the tonescale curve based on either global code values or global bone and tissue regions. None of the methods use spatially located regions of interest.

SUMMARY OF THE INVENTION

According to a feature of the present invention, there is provided a solution to the problem of finding the corresponding code values of the region of interest using landmark feature locations combined with a geometric region of interest generation method.

According to a feature of the present invention, there is provided a method for finding the histogram region of interest of a digital radiographic image comprising the steps of: providing a digital radiographic image; applying edge detection to the provided image; applying a thresholding operation to the edge data to detect strong edges and remove weaker edges; performing a connected component analysis; detecting features; matching the detected features with features stored in a library of spatially referenced landmarks; mapping the region of interest information stored in the library onto the image; producing a histogram of the mapped region of interest; generating a tonescale look-up-table; and processing the image through the tonescale look-up-table to generate a tonescaled image.

ADVANTAGEOUS EFFECT OF THE INVENTION

The invention provides a method to spatially find the region of interest. This is a significant improvement over previous methods which depend on error prone histogram peak and valley finding techniques which do not provide spatial information and could provide erroneous results if segmentation failed, or if the shape of the histogram was different from what was expected. This might be due to patient positioning, objects in the background, or radiation backscatter which would cause activity in the foreground regions, among other reasons.

The texture based technique requires significant computer computation to calculate the feature values. Additionally, this method sorts the code values for all the bone and tissue regions in the image into two groups. It does not provide the spatial location of the region of interest, such as the vertebrae in a c-spine image. In a c-spine image, the bone histogram would include the vertebrae bone code values, but would also include skull and shoulder bone code values. The image that results from applying the tonescale which was determined from these code values is less than optimal. Also, if the region of interest contains both bone and tissue regions, this method is ineffective.

The method of the invention provides a robust tonescale algorithm.

BRIEF DESCRIPTION OF THE DRAWINGS

FIG. 8 represents a table in which the landmark and region of interest is stored.

FIGS. 9a–9c are diagrammatic views illustrating the structure for the Library of Spatially Referenced Landmarks.

FIGS. 10a and 10b are diagrammatic views illustrating geometric transformation of the ROI.

DETAILED DESCRIPTION OF THE INVENTION

Figure 1:
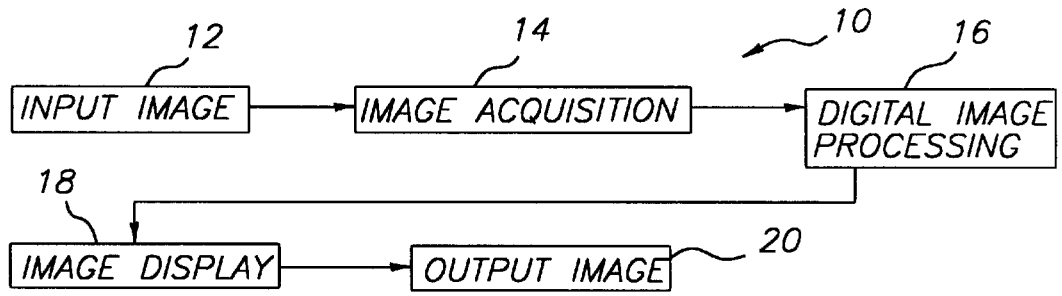
FIG. 1 is a block diagram of the imaging system in which the method of the present invention can be practiced.

FIG. 1 illustrates a typical system in which the described invention can be practiced. The system 10 includes input image 12, image acquisition system 14 (such as a projection radiography, MRI, CT, ultrasound system, or film digitizer), and digital image processing system 16 processes the digital image data according to the method of the invention to obtain an optimal representation of the data for presentation. The processed image could then be displayed on a softcopy device 18 or printed on a film or paper media in the output image block 20.

Figure 11:
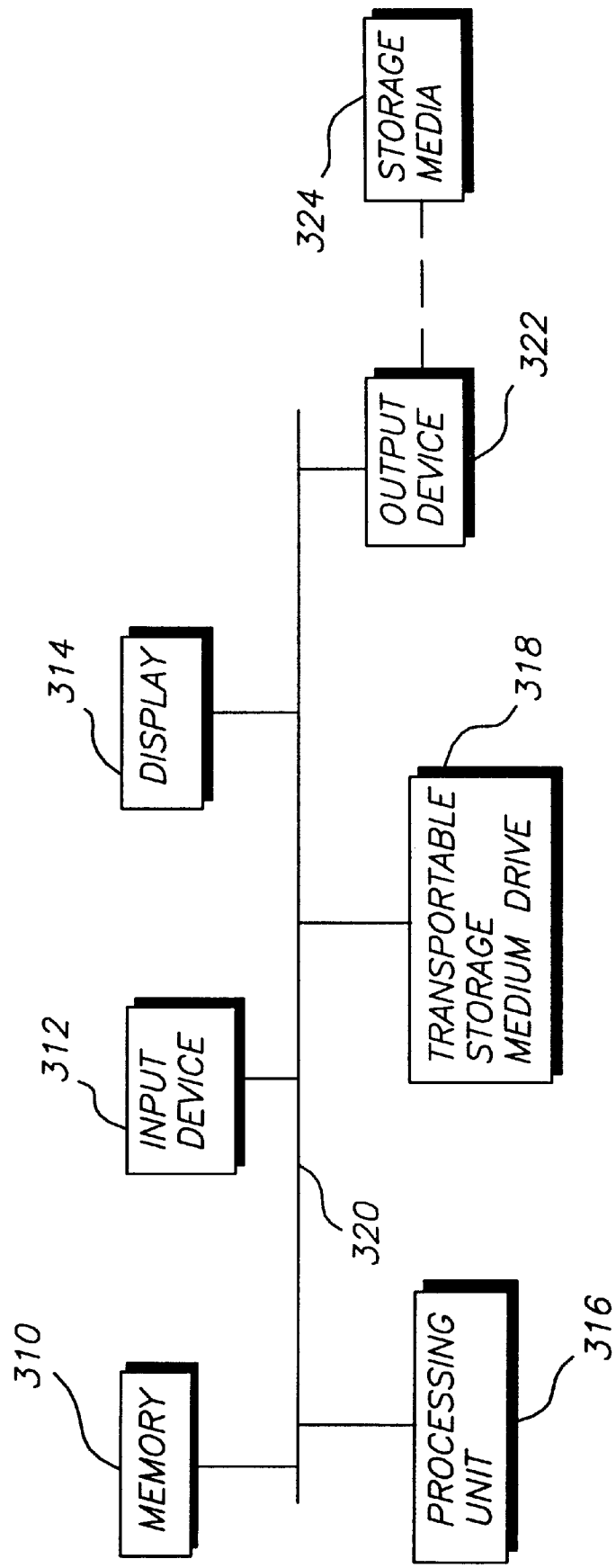
FIG. 11 is a block diagram of a digital imaging processor for carrying out the invention.

The digital image is processed in image processor 16, according to the method of the present invention. Image processor 16 can take the form of a digital computer, such as illustrated in FIG. 11. In such case, one or more of the steps of said method can be carried out using software routines. Image processor can also include hardware or firmware for carrying out one or more of said method steps. Thus, the steps of the method of the invention can be carried out using software, firmware, and hardware, either alone or in any preferable combination.

As shown in FIG. 11, a digital computer 300 includes a memory 310 for storing digital images, application programs, operating system, etc. Memory 310 can include mass memory (such as a hard magnetic disc or CD ROM), and fast memory (such as RAM). Computer 300 also includes input device 312 (such as a keyboard, mouse, touch screen), display 314 (CRT monitor, LCD), central processing unit 316 (microprocessor), output device 318 (thermal printer, dot matrix printer, laser printer, inkjet printer). Components 310,312,314,316,318 are connected together by control/data bus 320. Computer 300 can include a transportable storage medium drive 322 for reading from and/or writing to transportable storage media 324, such as a floppy magnetic disk or writeable optical compact disk (CD).

As used in this application, computer readable storage medium can include, specifically, memory 310 and transportable storage medium 324. More generally, computer storage medium may comprise, for example, magnetic storage media, such as magnetic disk (hard drive, floppy disk) or magnetic tape; optical storage media, such as optical disk, optical tape, or machine readable bar code; solid state electronic storage devices, such as random access memory (RAM), read only memory (ROM); or any other physical device or medium which can be employed to store a computer program.

Figure 2:
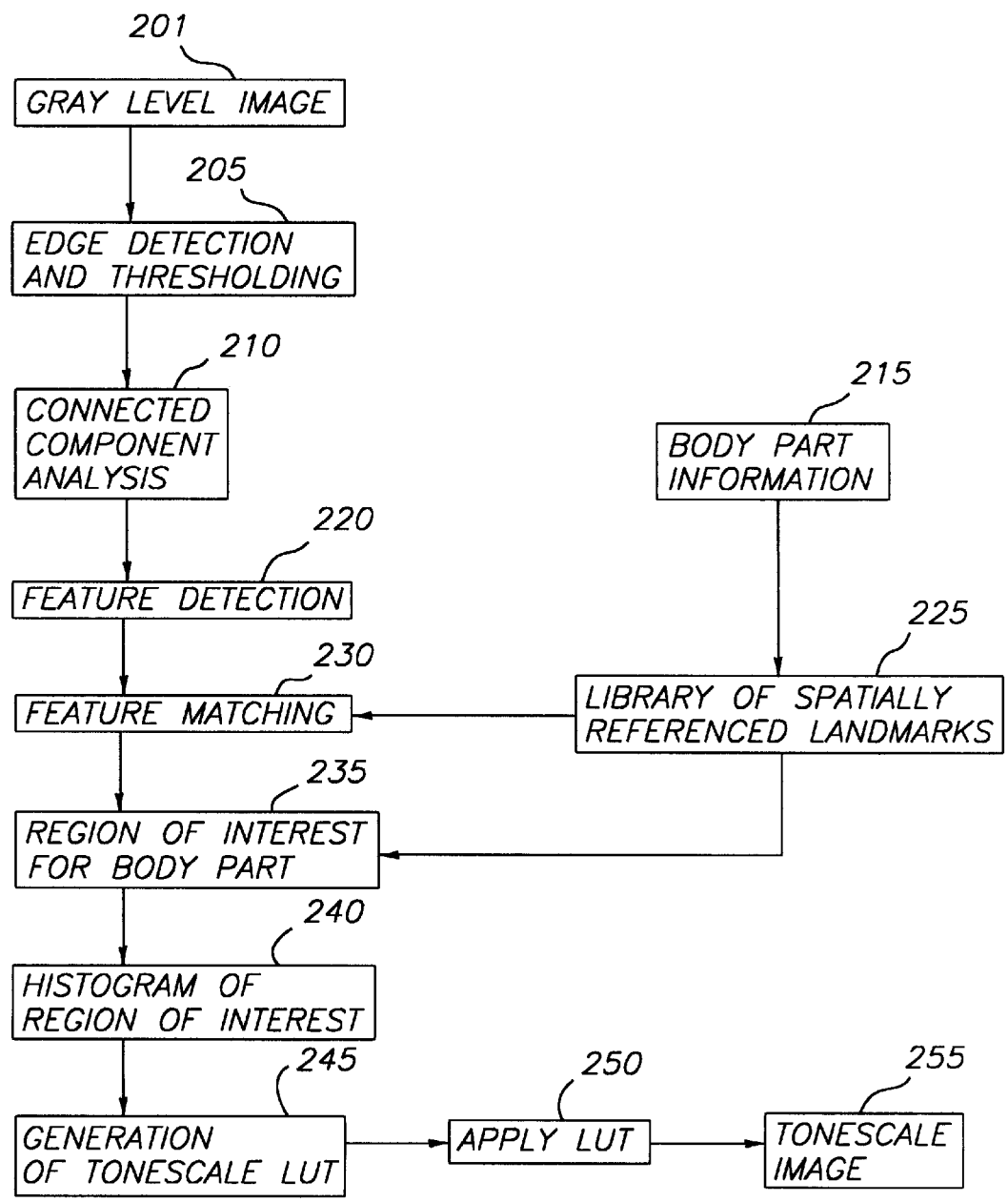
FIG. 2 is a block diagram showing the steps of the invention.

FIG. 2 illustrates the method of the present invention.

Figure 3:
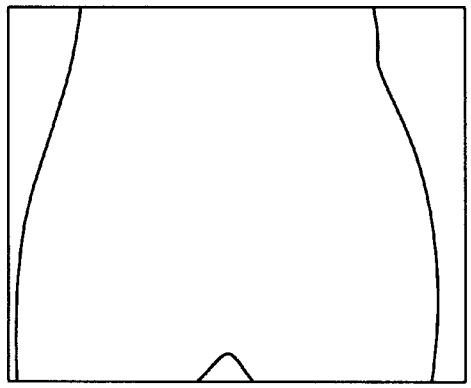
FIG. 3 is a diagrammatic view of an example of a gray level radiograph.

Box 201 is the original gray level digital radiographic image (such as shown in FIG. 3).

Figure 4:
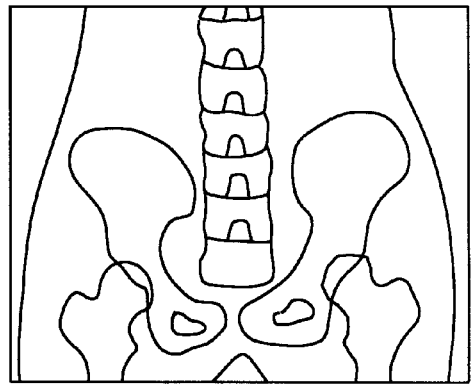
FIG. 4 is a diagrammatic view of an example of an edge map that was generated by using a gradient edge operator.
Figure 5:
FIG. 5 is a diagrammatic view of a thresholded edge map.

An edge detection algorithm, such as a Sobel, Laplacian, Robert's operator [Reference: Digital Image Processing, William Pratt, Wiley-International, 1991, Chapter 16, Edge Detection] is applied in Box 205. The result is illustrated in FIG. 4. Next, a thresholding operation is applied to the edge data to detect strong edges and remove the weaker edges. The result is illustrated in FIG. 5.

Figure 6:
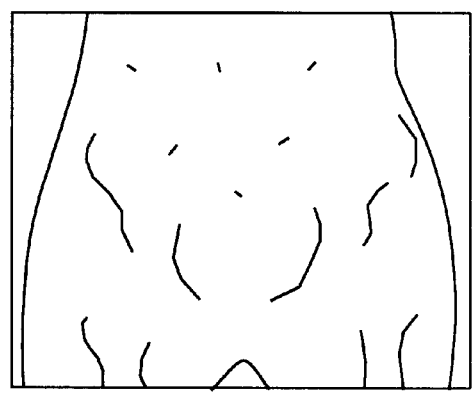
FIG. 6 is a diagrammatic view showing the result of applying a connected component operation to the thresholded edge map and discarding the short connected components.

A Connected Component Analysis using a chain code is performed in 210 (FIG. 2) [Reference: Computer Vision, Ballard and Brown, Prentice-Hall, 1982, p. 235–237]. A connected component is a connected series of pixels. Each pixel has a corresponding x and y value. The connected components arm rank ordered by length, and the shorter components are discarded. The result is illustrated in FIG. 6.

Figure 7A:
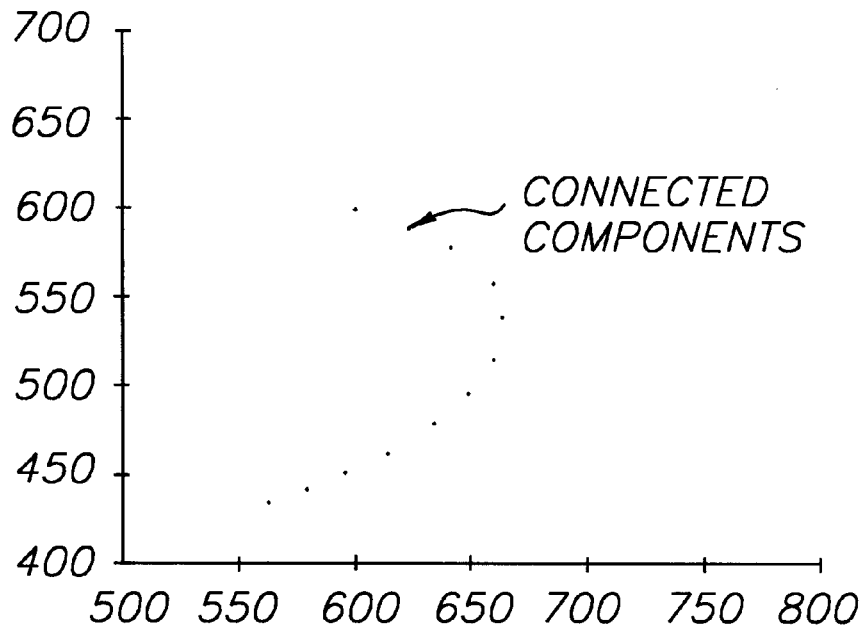
FIGS. 7a and 7b are graphical views of an example of the connected component data values and the conic curve derived from this data.
Figure 7B:
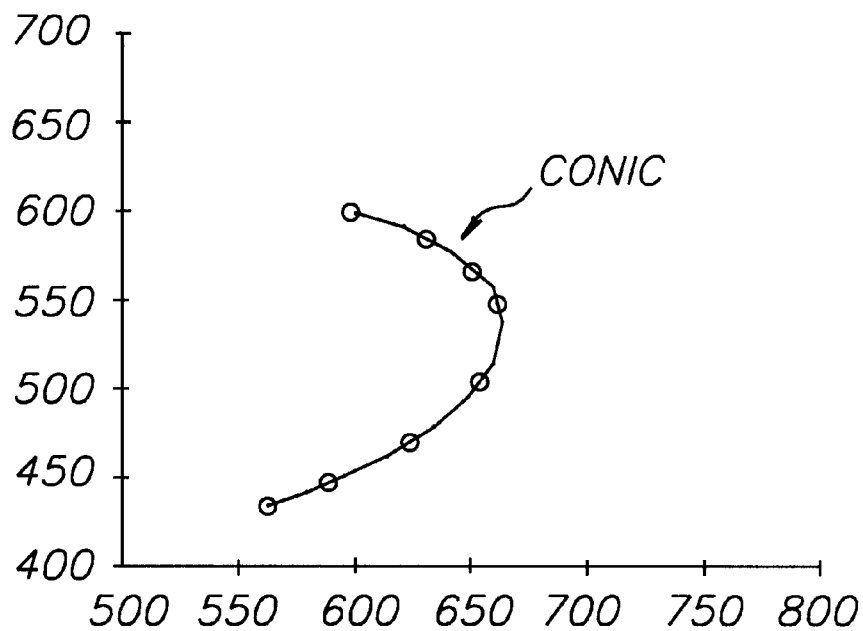

The remaining connected components are used to define the shape features (FIG. 2, Box 220). Several methods can be used to represent the shape features. The chain code used to represent the connected components can be used as features themselves, straight line segments can be used to approximate the curve segments, or a higher level representation, such as analytic functions could be used. An example of such a function is a conic. FIGS. 7a and 7b illustrate this method. A least squares fit to a generalized conic is used to determine the coefficients of the conic that best matches the connected component values [Reference: "A note on the least squares fitting of ellipses," Paul L. Rosin, Pattern Recognition Letters, Vol. 14, 1993, p. 799–808].

The characteristics of this conic (coefficients, orientation, resulting error of fit, etc.) are used as features that are matched to the Library of Spatially Referenced Features (Box 225, FIG. 2). The Body Part Information (Box 215) is used as an index to the library to locate the correct stored feature values and ROI (FIG. 8).

The feature values stored in the library 225 are determined by extracting the features from a large number of labeled images with known regions of interests during a training phase. The landmarks are represented by mean values and a variance. In addition to the key feature locations stored in the Library of Spatially Referenced Features 225, a region of interest (ROI) is geometrically defined by reference to the landmarks. The ROI is an area in the image defined to contain the significant diagnosis information. This region may or may not contain the detected landmarks, but is geometrically referenced to those landmarks. In one class of images, the ROI may be defined as a convex hull surrounding the features, but in another image class, the region of interest might be described as a region that is somehow related geometrically to the landmarks, such as above, below, to the right of, between two landmarks, etc.

Once the features from the image under evaluation and the stored landmarks are matched, the ROI information stored in the library will be mapped onto the image under investigation (Box 230). It is not necessary to match every feature in the reference library. FIGS. 9a–9c illustrate an example of key edges that would be represented by features for a image.

In Box 230 (FIG. 2), a matching metric is used to determine the best match between the features of the image under evaluation and the stored features in the Library of Spatially Referenced Features (Box 225). The image under evaluation may have fewer or more features that the features in the library. The key objective is to find a set of matching features that can be used as landmarks to determine the region of interest as defined in the library. A goodness metric is used to determine the match. One possible goodness metric would be to sum the number of matching features between the image under evaluation and the features stored in the library. The features may be weighted, that is, certain features that are judged to be detected more reliably than others would carry a higher weight. This will bias the goodness metric to favor robust features that which are reliably detected. It is also not necessary to have a perfect feature match. In addition to an exact location for a given feature, and specific characteristics for that feature, a range of locations and features are acceptable. For example, if a parabola of size 32 pixels with an orientation of north is defined in the library, a matching feature would be a parabola of size 32 pixels plus or minus some delta, with an orientation of north, plus or minus k degrees, where k is a constant value that was determined through experimentation with a large set of images. The variations from the data stored in the library would be used to determine the correct ROI on the image (FIG. 10).

The histogram of the data in the image under evaluation that corresponds to the transformed ROI (FIG. 2, Box 240) would be used to generate the tonescale curve.

This curve, in the form of a look-up-table, LUT, (FIG. 2, Box 250) would be used to map the gray level values of the pixels in the image to generate the tonescaled image (FIG. 2, Box 255).

The invention has been described in detail with particular reference to certain preferred embodiments thereof, but it will be understood that variations and modifications can be effected within the spirit and scope of the invention.

PARTS LIST 10 system
12 input image
14 image acquisition system
16 image processor
18 softcopy device
20 output image block
201 gray level image
205 edge detection and thresholding
210 connected component analysis
215 body part information
220 feature detection
225 Library of Spatially Referenced Landmarks
230 feature matching
235 region of interest for body part
240 histogram of region of interest
245 generation of tonescale LUT
250 apply LUT
255 tonescaled image
300 digital computer
310 memory
312 input device
314 display
316 central processing unit
318 output device
320 control/data bus
322 transportable storage medium drive
324 transportable storage medium

What is claimed is:

1. A method for finding the histogram region of interest of a digital radiographic image comprising the steps of:

providing a digital radiographic image;

applying edge detection to said provided image;

applying a thresholding operation to the edge data to detect strong edges and remove weaker edges;

performing a connected component analysis;

detecting spatial features;

matching the detected spatial features with spatial features stored in a library of spatially referenced landmarks of unique body parts;

mapping the region of interest information stored in said library onto said image;

producing a histogram of said mapped region of interest;

generating a tonescale look-up-table; and processing said image through said tonescale look-up-table to generate a tonescaled image.

2. The method of claim 1 wherein said applying step applies an edge detection algorithm, such as a Sobel, Laplacian, or Robert's operator.

3. The method of claim 1 wherein said performing step includes rank ordering connected components by length and discarding components with length less than database threshold, "T".

4. The method of claim 1 wherein said detecting features step includes one or more of the following: the chain code used to represent the connected components is used as features themselves, straight line segments are used to approximate curve segments, analytic functions are used such as a least squares fit to a generalized conic with characteristics of the conic (coefficients, orientation, resulting error of fit) used as features.

5. The method of claim 1 wherein said matching step includes using a goodness metric.

6. The method of claim 5 wherein said goodness metric is the sum of the number of matching features between the image under evaluation and the features stored in said library.

7. The method of claim 6 wherein said features are weighted so that features judged to be detected more reliably than others carry a higher weight.

8. A computer storage produce comprising:

a computer readable storage medium storing a computer program for carrying out a method for finding the histogram region of interest of a digital radiographic image comprising the steps of:

providing a digital radiographic image;

applying edge detection to said provided image;

applying a thresholding operation to the edge data to detect strong edges and remove weaker edges;

performing a connected component analysis;

detecting shape features;

matching the detected shape features with features stored in a library of spatially referenced landmarks of unique body parts;

mapping the region of interest information stored in said library onto said image;

producing a histogram of said mapped region of interest;

generating a tonescale look-up-table; and processing said image through said tonescale look-up-table to generate a tonescaled image.

* * * * *